United States Patent [15] 3,696,350

Cohen et al. [45] Oct. 3, 1972

[54] CONNECTED ROTATABLE PLIABLE DISK AND RIGID DISK WITH ANNULAR GROOVE FOR RECORDING USING AN AIR BEARING

[72] Inventors: William D. Cohen, 4 Fall Oak Drive, Huntington, N.Y. 11743; David E. Worster, 265 W. 5th St., West Islip, N.Y. 11795

[22] Filed: Aug. 27, 1970

[21] Appl. No.: 67,349

[52] U.S. Cl. ....................340/174.1 E
[51] Int. Cl. ....................G11b 5/60
[58] Field of Search..........179/100.2 P; 340/174.1 E

[56] References Cited

UNITED STATES PATENTS

| | | | |
|---|---|---|---|
| 3,178,719 | 4/1965 | Shapiro | 340/174.1 E |
| 3,537,083 | 10/1970 | Voth | 340/174.1 E |
| 3,212,075 | 10/1965 | Damerau et al. | 340/174.1 E |

*Primary Examiner*—Bernard Konick
*Assistant Examiner*—Robet S. Tupper
*Attorney*—Hane, Baxley & Spiecens

[57] ABSTRACT

A rotating rigid disk has concentrically connected thereto a pliable disk record medium. An annular groove is provided in the surface of the rigid disk opposite the pliable disk record medium. A transducer is fixed in close proximity to the surface of the pliable disk record medium opposite the annular groove.

The connected disks are rotated at sufficiently high speed to generate a centrifugal force on the pliable disk and a subatmospheric pressure within the annular groove so that the centrifugal force on the pliable disk and the force generated by the sub-atmospheric pressure within the annular groove dynamically balance with the aerodynamic forces established between the surface of the pliable disk and the end of the transducer extending within the region defined by the annular groove whereby an air bearing is established between the transducer and the surface of the pliable disk.

5 Claims, 4 Drawing Figures

INVENTORS
William D. Cohen
David E. Worster
BY Hane, Baxley and Spiecens
ATTORNEYS

CONNECTED ROTATABLE PLIABLE DISK AND RIGID DISK WITH ANNULAR GROOVE FOR RECORDING USING AN AIR BEARING

This invention pertains to data storage apparatus, and more particularly, to the recording of indicia on moving record medium wherein a narrow gap between a recording transducer and the moving surface of the record medium in maintained constant irrespective of the variable tolerances in the mechanical parts of the apparatus.

In data storage apparatus using moving record media such as magnetic disks or drums, it is known that the closer the recording head is to the magnetic surface of the disk or drum, the better the quality of the recording or reproducing. On the basis of only the transducer action, contact between the recording head and a rapidly moving disk produces the best results. However, such a configuration quickly abrades away the portion of the disk in contact with the head. Therefore, as a practical matter, a minimum gap must be maintained. Such a minimum gap requires extremely high tolerances for the mechanical parts.

Accordingly, there has been developed an air bearing solution to the problem. Relative spacing motion is permitted between the disk and the recording head. However, if the disk rotates at very high speed, an air bearing is established between the disk and the head. This concept has been exploited in two different ways.

In the first, a stiff magnetic disk is rotated opposite a flying head as shown, for example, in U. S. Pat. No. 3,037,205. However, such a device requires complicated servo and sensing systems to insure that when the disk is below a certain critical speed the head is retracted from the operative position. Furthermore, the head must follow deviations from the true plane in order to insure proper write and read gap conditions. In addition, the point of tangency of the head gap and disk surface is extremely difficult to maintain. Also, the mass of the head limits the speed of compliance of the system. Finally, any dirt coming between the head and disk can result in a catastrophic failure.

In the second approach, the recording head is fixed and a pliant disk is rotated at high speed opposite a fixed rigid plate. See, for example, U.S. Pat. Nos. 2,950,353; 3,178,719; 3,179,945 and 3,208,056. In such devices, a combination of centrifugal forces and "Bernoulli" forces produced by the rotation of the disk cause the disk to reach an equilibrium condition spaced from the rigid plate. However, such devices are still subject to the start up problem since the pliant disk initially rides over the rigid plate. Furthermore, the head to disk spacing is unpredictable. In addition, the relative rotation between the disk and the plate act as a centrifugal pump to expel air from between their opposed faces. This causes a suction to draw the disk to the plate which can result in damage or distruction to the rotating disk. An improvement in such devices is shown in U.S. Pat. Nos. 3,178,719 and 3,405,405, wherein pressure gradients move the pliant disks toward the recording head. In such devices, there must be provided either the source of an air jet or the source of a vacuum.

It is, accordingly, an object of the invention to provide an improved data storage apparatus which exploits the use of an air bearing to maintain a minimum gap between a transducer and a rotary record medium.

It is another object of the invention to provide an improved data storage apparatus utilizing a fixed recording transducer and a rotating pliable disk record medium wherein the record medium is biased toward the air bearing established between the transducer and the disk so that a dynamic balance is maintained between the air bearing force and the biasing forces to maintain a constant gap between the transducer and the disk.

It is a further object of the invention to satisfy the above objects with extremely simple and inexpensive apparatus.

Briefly, the invention contemplates data storage apparatus comprising a rigid disk and means for axially rotating the disk. There is a circular groove in one surface of the disk wherein the circular groove is concentric with the axis of rotation. A pliable record medium disk is concentrically connected to the rigid disk and lies opposite the surface thereof which contains the grove. A transducer means is fixedly supported in proximity to a surface of the pliable record medium disk opposite the circular groove.

Other objects, the features and advantages of the invention will be apparent from the following detailed description when read with the accompanying drawing which shows apparatus for practicing the invention.

Figure 1:
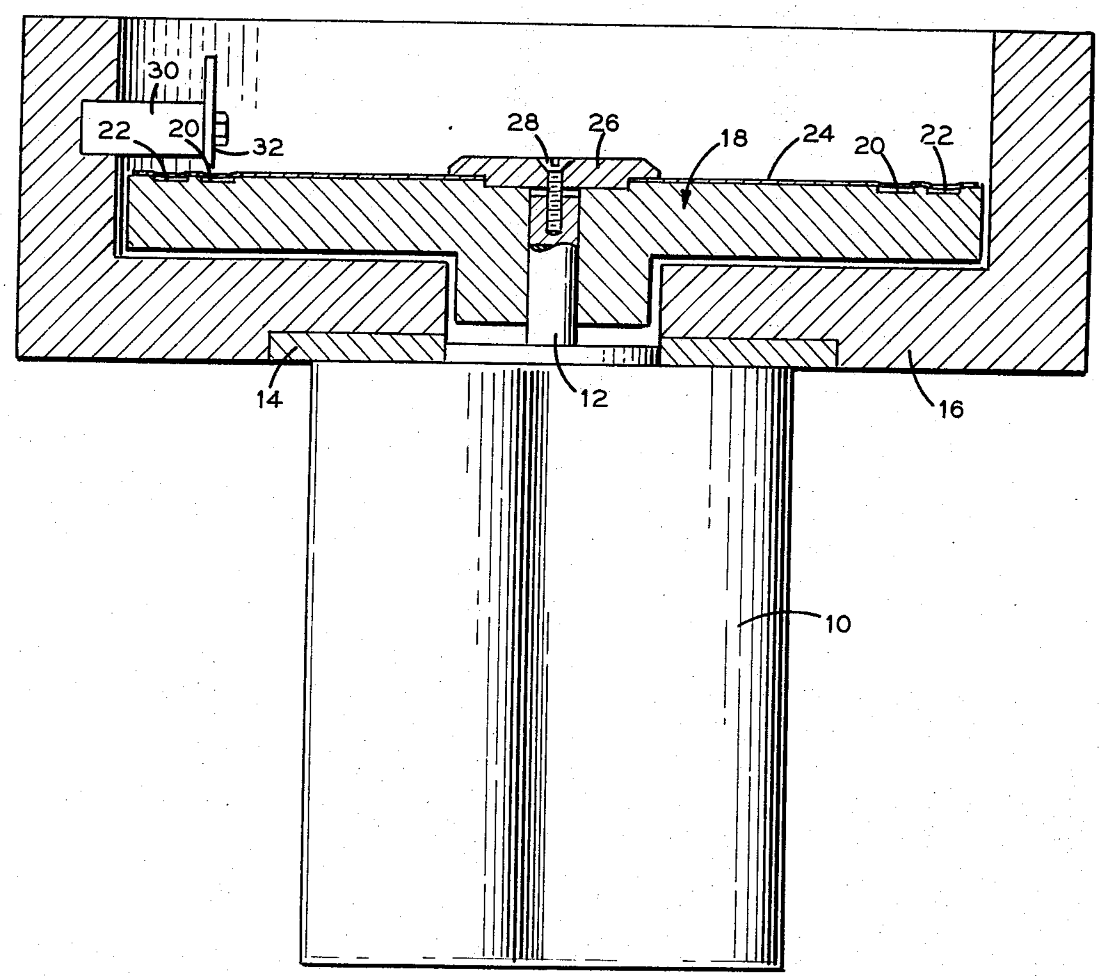
FIG. 1 shows a side view, partly in section, of one embodiment of the data storage apparatus, in accordance with the invention.
Figure 2:
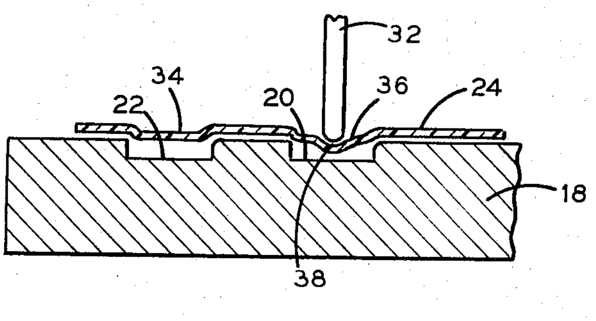
FIG. 2 is an enlarged cross-sectional view of a portion of the disks in the region of the transducer.

The data storage apparatus of FIG. 1 comprises a motor 10 with a shaft 12. Mounted on motor 10 via a thermal insulator 14 is a housing 16. Within housing 16 and fixed to shaft 12 is a rigid disk 18 of aluminum or the like. In the top surface of disk 18 are two annular grooves 20 and 22. Lying on the top surface of disk 18 is a membrane of plastic, such as Mylar, about 1 mil thick having a coating of magnetizable material, hereinafter called a pliable disk 24. Pliable disk 24 is concentrically connected to rigid disk 18 by means of retainer 26 and screw 28 threaded into the end of shaft 12. Mounted opposite the top surface of pliable disk 24 by means of bracket 30 extending from housing 16 is a magnetic recording head 32, a recording transducer. The tip of head 32, which is spherically shaped, extends downwardly into the groove 20. (See FIG. 2).

When the disks are rotated at a high speed, for example, 1,800 rpm, a centrifugal pump action evacuates the air between the disks 18 and 24 causing disk 24 to lie flat against disk 18 and, also, disk 24 forms a concave annular depression 34, 36 in grooves 22, 20, respectively. Additionally, centrifugal force exerts a radial force on disk 24 to pull it taut and flat. The low pressure acting on the disk 24 in the region of grooves 20 and 22 and the radial forces pulling the disk 24 radially outward balance each other and set up a spring condition in the disk in the region of the grooves. In this way, compliance is achieved for self-gapping purposes between the disk 24 and the head 32. Furthermore, there is an interaction between the head 32 and the disk 24 which by aerodynamic forces creates an air bearing in the form of a layer of air between them causing the disk 24 to "fly" over the tip of head 32. The result is that a saucer shaped cavity 38 is formed in the portion of disk 24 directly opposite the tip of head 32. It is believed that the forces necessary to form the cavity 38 equal the forces induced at that point by the air bearing. These forces are also balanced out by the radial forces on the disk 24 to set up another spring condition. It can be said that this other spring condition is equivalent to a high-rate spring of a mechanical servo system while the spring condition resulting in the annular groove 36 is equivalent to a low-rate spring of the mechanical servo system. The low-rate spring maintains the disk 24 in proper relation to head 32 while the high-rate spring forces the disk 24 in close conformity to head 32. In other words, the disk 24 is biased against the air bearing and conforms to the shape of the tip of the head. Accordingly, since this saucer shaped region forms itself about the spherical tip of the head, the head gap is automatically tangent to the magnetic surface of disk 24.

In addition, if a particle of dirt should enter the gap between head 32 and disk 24, the low mass and high compliance of this region of the disk 24 permits easy movement to allow particles to pass with little chance of injury to the system. Furthermore, head retraction mechanisms are unnecessary for starting and stopping conditions since the centrifugal force which stretches the disk 24 to urge it against head 32 is a function of rotational speed and during the times of these conditions, when "flying" is not present, that force is very small.

It should be noted that the outer groove 22 is provided to reduce frictional forces between the disk 18 and the disk 24 so that the radial forces are not excessively impeded.

Figure 3:
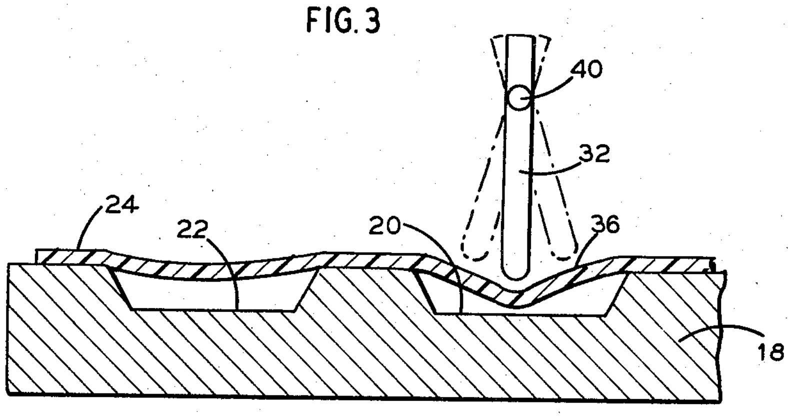
FIG. 3 is another enlarged cross-sectional view similar to FIG. 2 which shows the various orientations of the transducer.

Since the saucer shaped cavity 38 conforms to the tip of head 32 it is possible to rotate head 32 about its mounting axis 40 which is a center of radius of the cross section of the annular groove 20, (see FIG. 3) to provide a multitrack recording channel with a single magnetic head 32.

Figure 4:
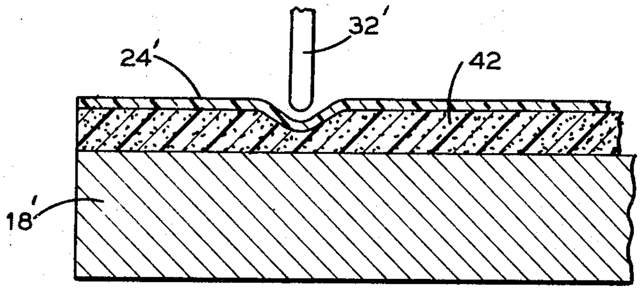
FIG. 4 shows an alternate embodiment of a portion of the disks of FIG. 1.

It should be realized that action of the low pressure air in groove 20 and the radial (centrifugal) forces on the disk 24 is a resilient means which urges the disk 24 toward the tip of head 32. Such an effect can be accomplished for certain uses of the data storage apparatus by the embodiment of the disks shown in FIG. 4. Since most of the elements are the same, prime reference characters will be used for the like elements and only the differences will be mentioned. In particular, grooves 20 and 22 are replaced by a resilient layer 42 of highly resilient plastic sponge to provide the biasing of disk 24 toward the air bearing.

While the invention has been described with respect to a specific embodiment it will be apparent to those skilled in the art that there are many modification and variations satisfying many or all of the objects of the invention but which do not depart from the spirit thereof as defined by the appended claims.

What is claimed is:

1. Data storage apparatus comprising a disk of rigid material, an annular groove in one surface of said disk of rigid material, said annular groove being defined by a circle having a center concentric with the center of said disk of rigid material and having a given radius, a pliable disk of magnetic material resting on said one surface, means for fixedly connecting said pliable disk to said disk of rigid material only at points in the region defined by the circle demarcated by the edge of the annular grove nearest the center of said disk of rigid material, a magnetic transducer head located in close proximity to the surface of said pliable disk remote from said disk of rigid material and extendable within the region defined by the annular groove and means for rotating said connected disks at sufficiently high speed to generate a centrifugal force on said pliable disk and a subatmospheric pressure within the annular groove so that the centrifugal force on said pliable disk and the force generated by the sub-atmospheric pressure within the annular groove dynamically balance with the aerodynamic forces established between the surface of said pliable disk and the end of the magnetic transducer head extending within the region defined by the annular groove whereby an air bearing is established between said magnetic transducer head and the surface of said pliable disk.

2. The apparatus of claim 1 further comprising means for moving said magnetic transducing head along a radius of said disks.

3. The apparatus of claim 1 further comprising means pivoting said magnetic transducer head about a radial axis which is disposed above said pliable disk.

4. The data storage apparatus of claim 1 further comprising a second annular groove in said one surface radially outward displaced from and concentric with said first annular groove.

5. The apparatus of claim 4 further comprising means for moving said magnetic transducing head along a radius of said disks.

* * * * *